(No Model.)
F. GLEASON.
TIRE FOR CYCLES.
No. 451,477. Patented May 5, 1891.
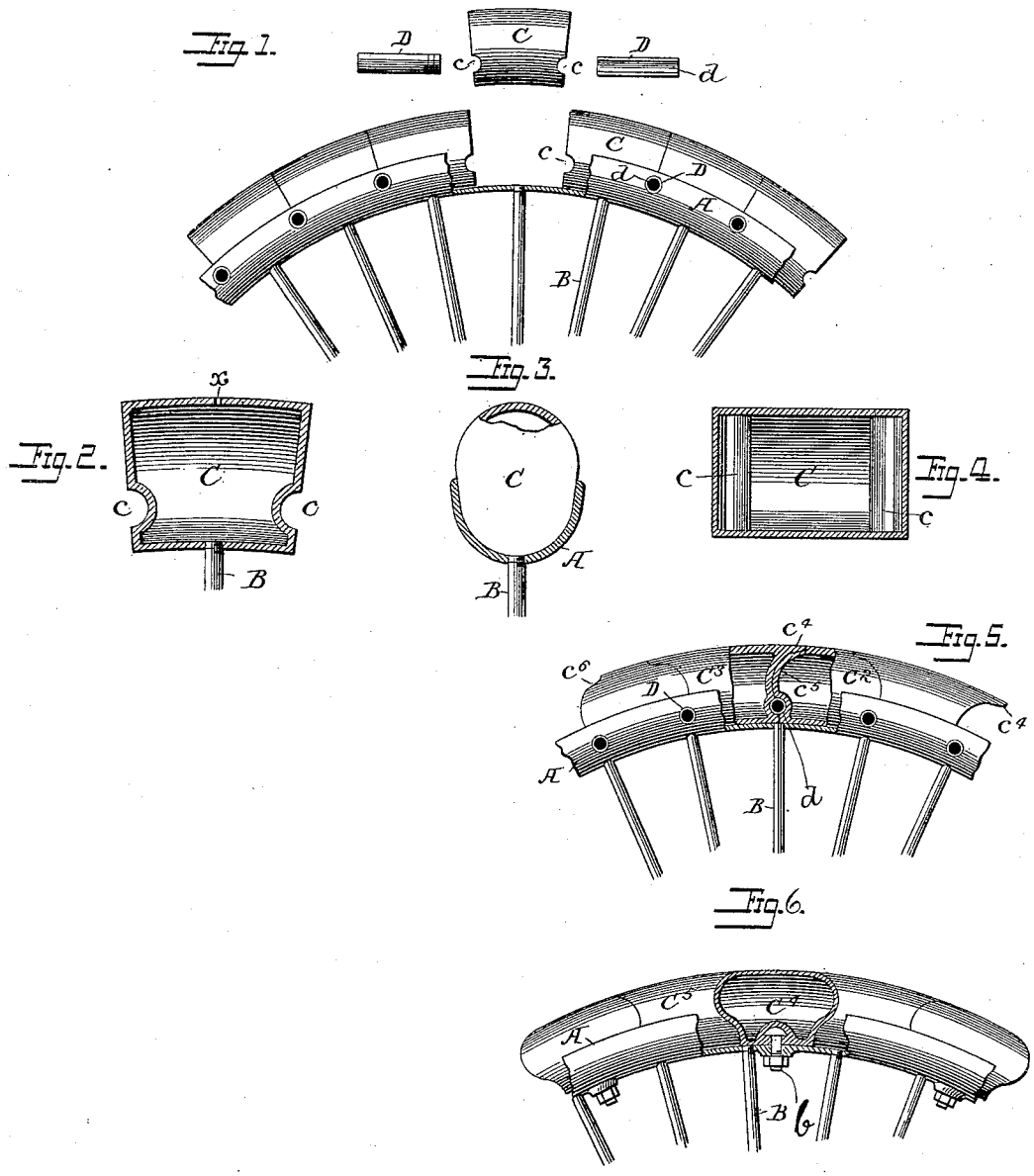
WITNESSES
Jno. G. Hinkel
H. S. McArthur
INVENTOR
F. Gleason
By Foster & Freeman
Attorneys

UNITED STATES PATENT OFFICE.

FRANCIS GLEASON, OF PHILADELPHIA, PENNSYLVANIA.

TIRE FOR CYCLES.

SPECIFICATION forming part of Letters Patent No. 451,477, dated May 5, 1891.

Application filed October 3, 1890. Serial No. 366,922. (No model.)

*To all whom it may concern:*

Be it known that I, FRANCIS GLEASON, a citizen of the United States, residing at Philadelphia, county of Philadelphia, State of Pennsylvania, have invented certain new and useful Improvements in Tires for Cycles, of which the following is a specification.

My invention relates to tires adapted more especially for cycles; and it has for its object to provide a hollow sectional tire of elastic material which may be attached to or removed from the felly, so that in case of accident or wear on the tire a portion of it may be readily removed and replaced by a perfect piece; and my invention consists in a tire constructed of elastic material and made in hollow sections and arranged to be connected to the felly, substantially as hereinafter set forth.

In the accompanying drawings, Figure 1 is a side view of a portion of a cycle-wheel, showing my invention applied thereto. Figs. 2, 3, and 4 are respectively side, end, and plan views of a section of the tire, parts being broken away to show the preferred construction. Figs. 5 and 6 are side views, partially in section, showing modified arrangements and construction.

It is common to provide cycles with tires of some flexible material—such as rubber, leather, or the like—which is supported and held in the metallic felly, and these tires are generally constructed in one continuous piece, and it results that when through accident or wear the tire is rendered ineffective in any portion the whole of it has to be removed and either a new tire substituted or an old one spliced or patched to cure the defect. This is not only expensive, but in case of accident on the road the wheel is rendered ineffective, causing annoyance and delay to the rider.

In some cases it has been proposed to make a solid rubber tire in sections which can be removed and replaced. It has also been proposed to make a hollow belt in sections, which sections are inclosed in a strong outer casing of leather, &c., which is bolted to the tire.

In carrying out my invention I construct the tire in hollow sections of elastic material, which are adapted to be secured directly to the felly and to form the bearing-surface or tread of the wheel. These sections are readily removable and replaced in case of accident.

In the drawings, A represents a felly, preferably made of steel and having the usual grooved form, adapted to receive the tire in its outer periphery. The particular shape and configuration of this felly of course will depend upon the shape and configuration of the tire. This felly is supported upon the spokes B, which may be arranged in any of the usual or desired ways.

The tire itself is made up of a series of sections or parts C, each of which is separably detachable from the felly and is made of elastic material—such as rubber, leather, or the like—and is hollow and air-tight. These sections may be attached to the felly in various ways, and, as shown in Fig. 1, each section is provided with a recess $c$ transversely across its opposite ends and arranged so that the abutting ends of two sections will form an opening through which a bolt or other fastening device D, preferably in the form of a hollow tube, can be passed, the ends thereof passing through the opening $d$ in the sides of the felly and being secured therein in any suitable manner, as by screw-threads or equivalent means. With this construction it is apparent that in order to remove any particular section of the tire it is only necessary to remove the fastening devices passing through the openings in the felly and the recesses in the ends of the section, when it can be withdrawn and another and perfect one substituted for it without serious delay.

While I preferably make the sections airtight, in some instances I make a small hole or opening, as at $x$, through the walls of the section, which will allow the air to escape slowly when under pressure, as when the sections are in contact with the ground. This prevents the cutting of the section, as it allows it to yield more freely than when airtight, and the section will expand by its own elasticity and again fill with air before it reaches the ground in the revolution of the wheel.

In Fig. 5 the sections $C^2$ are shown as being made in a slightly-different form, so that the joint between the sections shall be covered by a lap to prevent the entering of any foreign matter between the sections. In the illustration I have shown each alternative section as being of a different configuration—that is, the section $C^3$ is provided with concave vertical sides $c^3$ and projecting lap $c^4$ at each end, while the section $C^2$ is provided with concave vertical sides $c^5$, adapted to fit the corresponding concave side of the adjacent section, and is formed with a cavity or depression $C^6$ for the reception of the lap of the adjacent section. It is evident, however, that all the sections may be alike, one end being provided with a concave vertical surface and projecting lap $c^3$ $c^4$ and the other end with the convex surface and cavity $c^5$ $c^6$.

In Fig. 6 I have shown the sections $C^4$ and $C^5$ of a slightly-different configuration and as being provided with a bolt $b$, having its head embedded in the body of the section and its free end extending outward to be connected to the felly and secured by a nut or similar device.

From the above description it will be seen that while the details of construction and arrangement of the sections and their means of attachment may be varied the general principles are the same, and the same objects and results are accomplished in substantially the same way, and the tire may be used on wheels for carriages and wagons as well as on cycles.

What I claim is—

1. The combination, with the grooved felly of a velocipede, of a tire constituting the bearing-surface or tread of the wheel, the said tire being made up of a series of hollow elastic sections fitting the groove, and each section being provided with a normally-open hole for the passage of the air under pressure of the wheel, substantially as described.

2. The combination, with the grooved felly of a velocipede, of a tire consisting of hollow elastic sections fitting the groove, the sections being provided with overlapping joints, substantially as described.

3. The combination, with the curved felly, of the hollow elastic tire-sections having overlapping joints, recesses in the ends of the sections, and hollow bolts passing through the recesses of two adjacent sections and through the flanges of the curved felly, substantially as described.

In testimony whereof I have signed my name to this specification in the presence of two subscribing witnesses.

FRANCIS GLEASON.

Witnesses:
S. P. COURTNEY,
FRANCIS A. FOWLER.